(12) United States Patent
Gokmen et al.

(10) Patent No.: US 10,664,745 B2
(45) Date of Patent: May 26, 2020

(54) RESISTIVE PROCESSING UNITS AND NEURAL NETWORK TRAINING METHODS

(71) Applicant: INTERNATIONAL BUSINESS MACHINES CORPORATION, Armonk, NY (US)

(72) Inventors: Tayfun Gokmen, Briarcliff Manor, NY (US); Michael P. Perrone, Yorktown Heights, NY (US); Yurii A. Vlasov, Katonah, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1002 days.

(21) Appl. No.: 15/196,346

(22) Filed: Jun. 29, 2016

(65) Prior Publication Data
US 2018/0005110 A1   Jan. 4, 2018

(51) Int. Cl.
G06N 3/063 (2006.01)
G06N 3/04 (2006.01)
G06N 3/08 (2006.01)

(52) U.S. Cl.
CPC .......... *G06N 3/063* (2013.01); *G06N 3/0472* (2013.01); *G06N 3/084* (2013.01)

(58) Field of Classification Search
CPC ............ G06N 3/04; G06N 3/08; G06N 3/063; G06N 3/0472
See application file for complete search history.

(56) References Cited

U.S. PATENT DOCUMENTS 6,128,489 A   10/2000  Seazholtz et al.
9,715,656 B1 * 7/2017  Gokmen ................. G06N 3/08
(Continued)

FOREIGN PATENT DOCUMENTS

WO   2012006299 A1   1/2012
WO   2012122425 A1   9/2012
WO   2014017201 A1   1/2014

OTHER PUBLICATIONS

Roska et al. "The CNN universal machine: an analogic array computer." Mar. 1993, IEEE Transactions on Circuits and Systems II: Analog and Digital Signal Processing vol. 40, No. 3, pp. 163-173 (Year: 1993).*
(Continued)

*Primary Examiner* — Kamran Afshar
*Assistant Examiner* — Randall K. Baldwin
(74) *Attorney, Agent, or Firm* — Cantor Colburn LLP; Vazken Alexanian

(57) ABSTRACT

An array of resistive processing units (RPUs) comprises a plurality of rows of RPUs and a plurality of columns of RPUs wherein each RPU comprises an AND gate configured to perform an AND operation of a first stochastic bit stream received from a first stochastic translator translating a number encoded from a neuron in a row and a second stochastic bit stream received from a second stochastic translator translating a number encoded from a neuron in a column. A first storage is configured to store a weight value of the RPU, and a second storage is configured to store an amount of change to the weight value of the RPU. When the first stochastic bit stream and the second stochastic bit stream coincide, the amount of change to the weight value of the RPU is added to the weight value of the RPU.

12 Claims, 8 Drawing Sheets

(56) References Cited

U.S. PATENT DOCUMENTS

| | | | |
|---|---|---|---|
| 9,779,355 B1* | 10/2017 | Leobandung | G06N 3/084 |
| 9,887,351 B1* | 2/2018 | Ando | H01L 45/1608 |
| 2003/0081624 A1 | 5/2003 | Aggarwal et al. | |
| 2003/0149676 A1 | 8/2003 | Kasabov | |
| 2004/0210417 A1* | 10/2004 | Zakrzewski | G06N 3/08 |
| | | | 702/181 |
| 2005/0025097 A1 | 2/2005 | Paneth et al. | |
| 2012/0170735 A1 | 7/2012 | Huang et al. | |
| 2014/0215121 A1* | 7/2014 | Ordentlich | G06F 12/0246 |
| | | | 711/102 |
| 2014/0341273 A1 | 11/2014 | Ye et al. | |
| 2015/0379395 A1* | 12/2015 | Pickett | G11C 11/54 |
| | | | 706/27 |
| 2016/0049195 A1* | 2/2016 | Yu | G11C 13/0026 |
| | | | 365/63 |
| 2017/0255225 A1* | 9/2017 | Lilja | G06T 1/00 |

OTHER PUBLICATIONS

Yavits et al., "Resistive Associative Processor", Nov. 2014, IEEE Computer Architecture Letters, vol. 14, No. 2, pp. 148-151 (Year: 2014).*

Vincent, et al. "Spin-transfer torque magnetic memory as a stochastic memristive synapse.", 2014 IEEE International Symposium on Circuits and Systems (ISCAS), pp. 1074-1077 (Year: 2014).*

Gokmen, Tayfun, and Yurii Vlasov. "Acceleration of deep neural network training with resistive cross-point devices: Design considerations." Frontiers in neuroscience 10 (Jul. 21, 2016): 333. (Year: 2016).*

Wang et al., "A Design and Implementation of Reconfigurable Architecture for Neural Networks Based on Systolic Arrays", Advances in Neural Networks-ISNN 2006, Springer Berlin Heidelberg, 2006, pp. 1328-1333.

* cited by examiner

RESISTIVE PROCESSING UNITS AND NEURAL NETWORK TRAINING METHODS

BACKGROUND

The present invention generally relates to neural network hardware, and more particularly to neural network hardware having resistive processing units and training methods using the neural network hardware having the resistive processing units.

Deep Neural Networks (DNNs) demonstrated significant commercial success in recent years with performance exceeding sophisticated prior methods in speech and object recognition. However, training the DNNs is an extremely computationally intensive task that requires massive computational resources and enormous training time that hinders their further application. For example, a 70% relative improvement has been demonstrated for a DNN with 1 billion connections that was trained on a cluster with 1000 machines for three days. Training the DNNs relies in general on the backpropagation algorithm that is intrinsically local and parallel. Therefore, it is desirable to exploit hardware approaches to accelerate DNN training.

Therefore, heretofore unaddressed needs still exist in the art to address the aforementioned deficiencies and inadequacies.

SUMMARY

According to an embodiment of the present invention, an array of resistive processing units comprises a plurality of rows of resistive processing units and a plurality of columns of resistive processing units wherein each resistive processing unit comprises an AND gate configured to perform an AND operation of a first stochastic bit stream received from a first stochastic translator translating a number encoded from a neuron in a row and a second stochastic bit stream received from a second stochastic translator translating a number encoded from a neuron in a column. A first storage is configured to store a weight value of the resistive processing unit, and a second storage is configured to store an amount of change to the weight value of the resistive processing unit. When the first stochastic bit stream and the second stochastic bit stream coincide, the amount of change to the weight value of the resistive processing unit is added to the weight value of the resistive processing unit.

According to another embodiment of the present invention, a neural network comprises an array of resistive processing units having a plurality of rows of resistive processing units; and a plurality of columns of resistive processing units, wherein each resistive processing unit comprises: an AND gate configured to perform an AND operation of a first stochastic bit stream received from a first stochastic translator translating a number encoded from a neuron in a row and a second stochastic bit stream received from a second stochastic translator translating a number encoded from a neuron in a column. A first storage is configured to store a weight value of the resistive processing unit, and a second storage is configured to store an amount of change to the weight value of the resistive processing unit. When the first stochastic bit stream and the second stochastic bit stream coincide, the amount of change to the weight value of the resistive processing unit is added to the weight value of the resistive processing unit.

According to yet another embodiment of the present invention, a method of two step neural network training comprises providing a first array of resistive processing units. A first step neural network training is performed using the first array of resistive processing units. A second step neural network training is performed using a high precision neural network.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
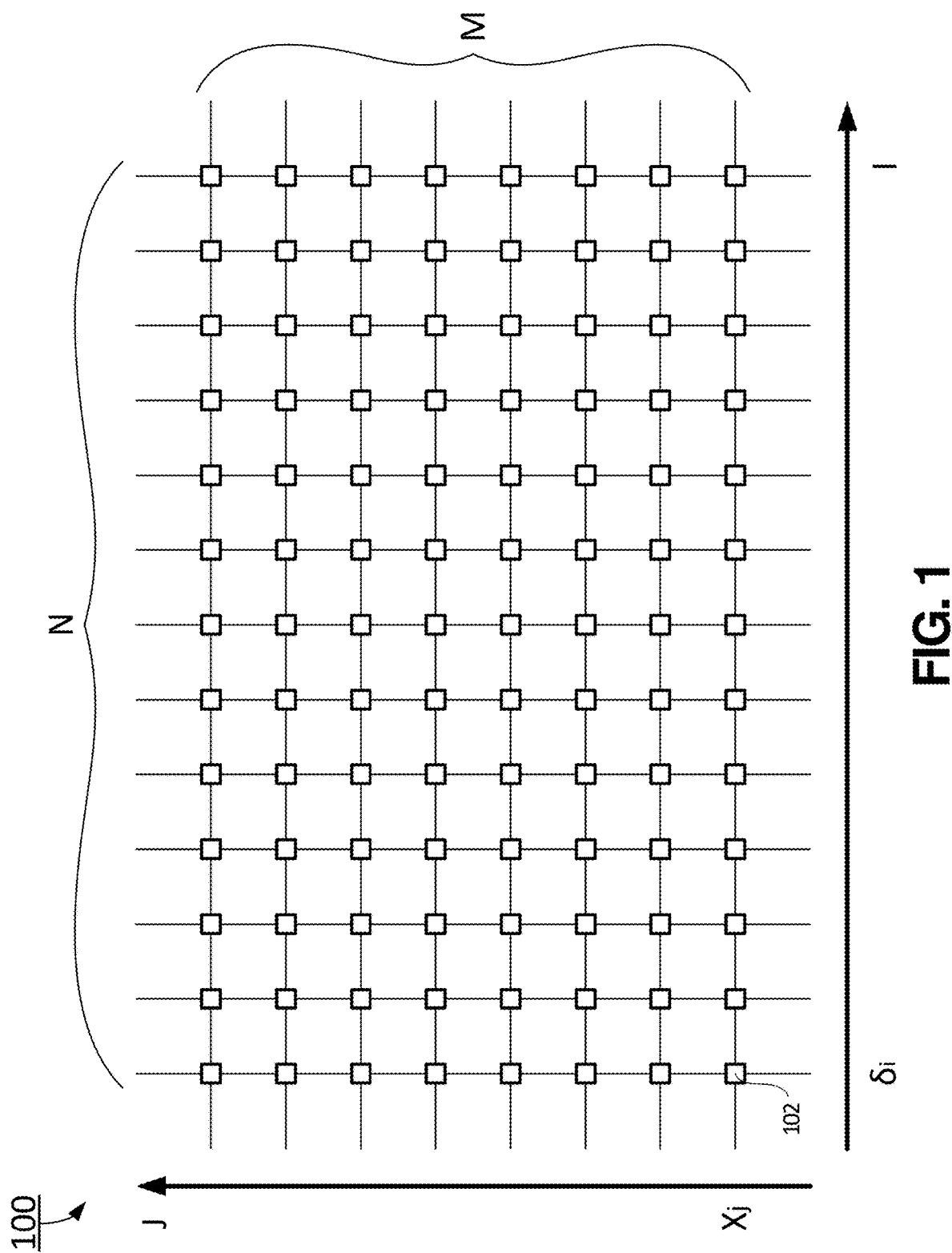
FIG. 1 illustrates a portion of a neural network hardware having an array of resistive processing units according to certain embodiments of the present disclosure.

The exemplary embodiments described herein relate to an array of resistive processing units (RPU) 100 as shown in FIG. 1 according to certain embodiments of the present disclosure. In one embodiment, the array of RPU 100 may include N columns and M rows of individual RPU 102. Each of the RPUs is electrically coupled to a 2D crossbar array of two terminal resistive processing units using a backpropagation algorithm for neural network training. In a certain embodiment, the backpropagation algorithm may include three cycles: forward, backward, and weight update that repeated many times until a convergence criterion is met. The forward and backward cycles mainly involve computing vector-matrix multiplication in forward and backward directions. In forward cycle, stored conductance values in the crossbar array form a matrix, whereas the input vector is transmitted as voltage pulses through each of the input rows. In a backward cycle, when voltage pulses are supplied from columns as an input, then the vector-matrix product is computed on the transpose of a matrix. These operations achieve the required O(1) time complexity, but only for two out of three cycles of the training algorithm.

The term "DNN" stands for deep neural network.

The term "RPU" stands for resistive processing unit.

The term "CMOS" stands for complementary metal-oxide semiconductor.

The term "STR" stands for stochastic translator.

In contrast to forward and backward cycles, implementing the weight update on a 2D crossbar array of resistive processing units locally and all in parallel, independent of the array size, is challenging. It requires calculating a vector-vector outer product may require a multiplication operation and an incremental weight update to be performed locally at each cross-point as illustrated in FIG. 2.

Figure 2:
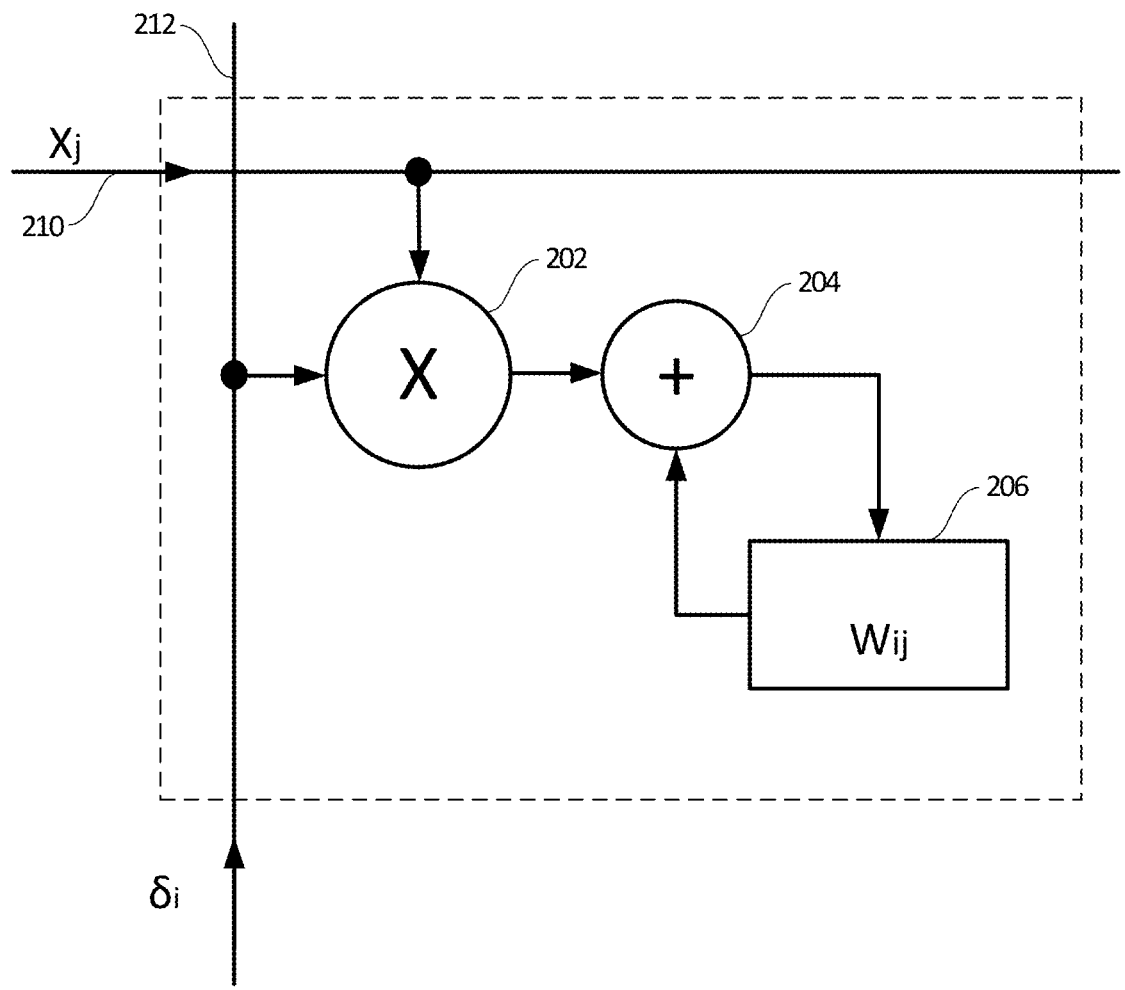
FIG. 2 is a circuit diagram of a resistive processing unit according to one embodiment of the present disclosure.

Referring now to FIG. 2, a circuit diagram of a resistive processing unit (RPU) 102-1 is shown according to one embodiment of the present disclosure. Conventionally, a corresponding update rule is usually expressed as:

$$w_{ij} \leftarrow w_{ij} + \eta x_i \delta_j \quad (1)$$

The RPU 102-1 may include an activity at an input neuron $x_j$ 210, an error computed by an output neuron $\delta_j$ 212, and $\eta$, a global learning rate. The RPU 102-1 may also include a multiplier 202, and an adder 204, and a weight value for the $i^{th}$ row and the $j^{th}$ column $w_{ij}$ 206.

Such update involving multiplication and addition is difficult to implement for resistive processing units. Addition is easy to implement, but multiplication may require sophisticated hardware elements such as arithmetic logic unit (ALU) and/or floating point unit (FPU). Each RPU may take much larger space because of these sophisticated hardware elements. In order to implement a local and parallel update on an array of two-terminal devices that can perform both weight storage and processing (by resistive processing unit or RPU), a significantly simplified computation method is devised. By using two stochastic streams, the multiplication operation can be reduced to a simple AND operation.

Figure 3:
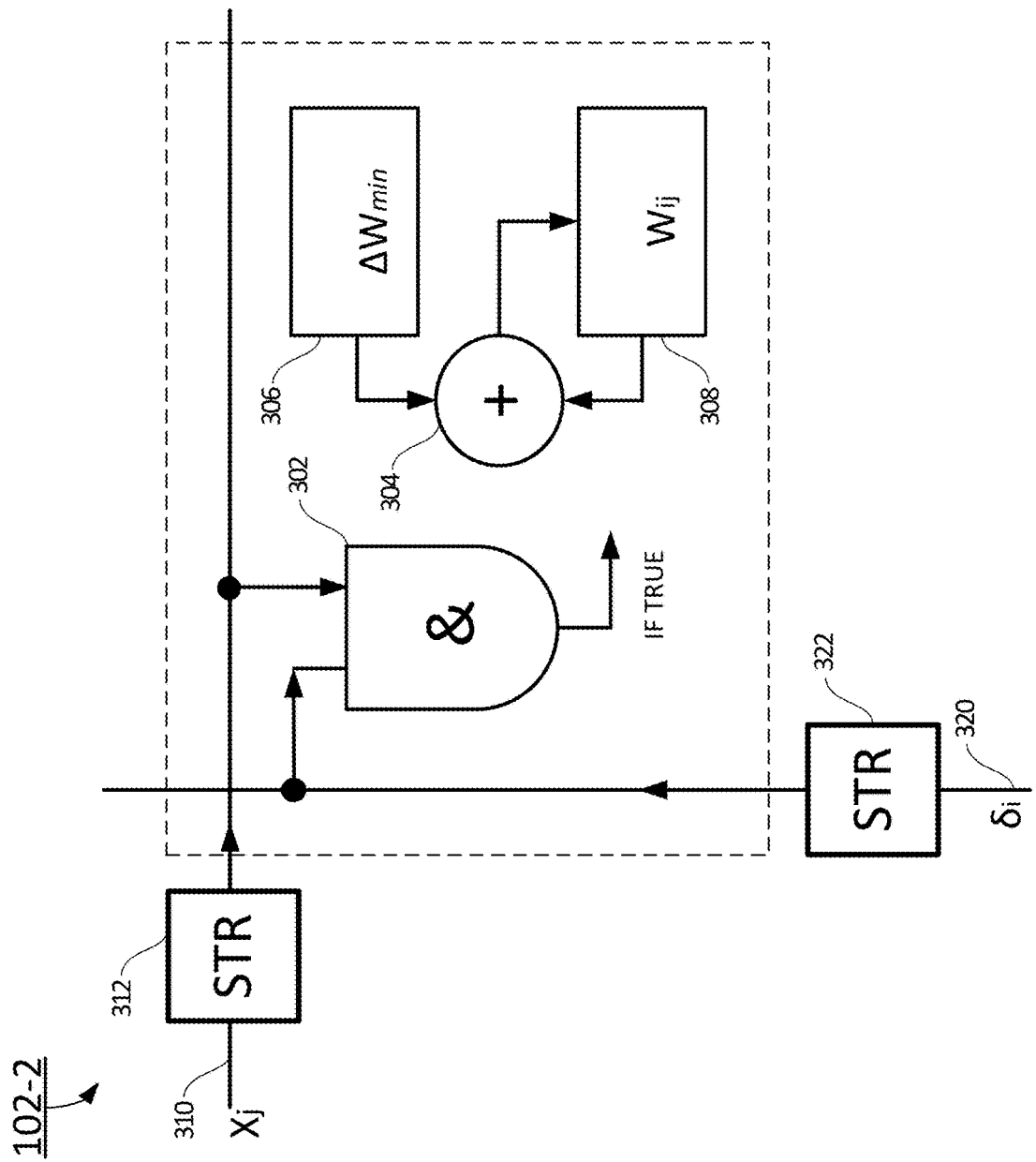
FIG. 3 is a circuit diagram of an alternative resistive processing unit according to another embodiment of the present disclosure.

Referring FIG. 3, a circuit diagram of an alternative resistive processing unit (RPU) 102-2 requiring no multiplications is shown according to another embodiment of the present disclosure. The RPU 102-2 may include an activity at an input neuron $x_j$ 310, an error computed by an output neuron $\delta_i$ 320, a first stochastic translator (STR) 312, a second stochastic translator (STR) 322, an AND gate 302, an adder 304, a first storage 306 for storing a change in the weight value due to a single coincidence event $\Delta w_{min}$, and a second storage 308 for the weight value $w_{ij}$.

In certain embodiments, FIG. 3 illustrates the stochastic update rule where numbers that are encoded from neurons ($x_j$ 310 and $\delta_i$ 320) are translated to stochastic numbers using stochastic translators (STR) 312 and 322. Then they are sent to the crossbar array where each RPU device changes its conductance ($g_{ij}$) slightly when bits from $x_j$ 310 and $\delta_i$ 320 coincide. In certain embodiments, the update rule may be expressed as:

$$w_{ij} \leftarrow w_{ij} + \Delta w_{min} \sum_{n=1}^{BL} A_i^n \wedge B_j^n \quad (2)$$

where BL is length of the stochastic bit stream at the output of STRs 312 and 322, that is used during the update cycle. $A_i^n$ and $B_j^n$ are random variables that are characterized by Bernoulli process, and a superscript n represents bit position in the reail sequence. The probabilities that $A_i^n$ and $B_j^n$ are equal to unity are controlled by $Cx_i$ and $C\delta_j$, respectively, where C is a gain factor in the STR.

Figure 4:
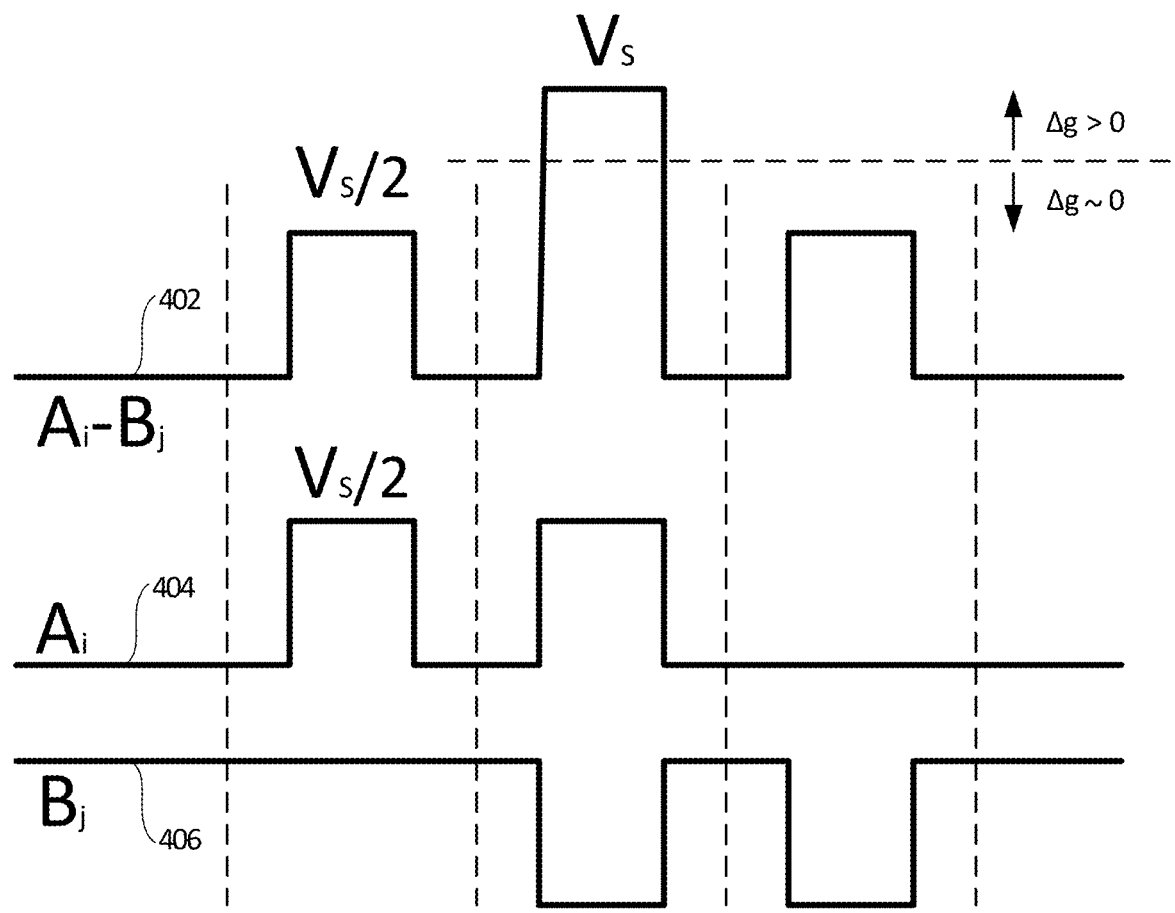
FIG. 4 illustrates a pulsing scheme for the resistive processing units according to certain embodiments of the present disclosure.
Figure 5:
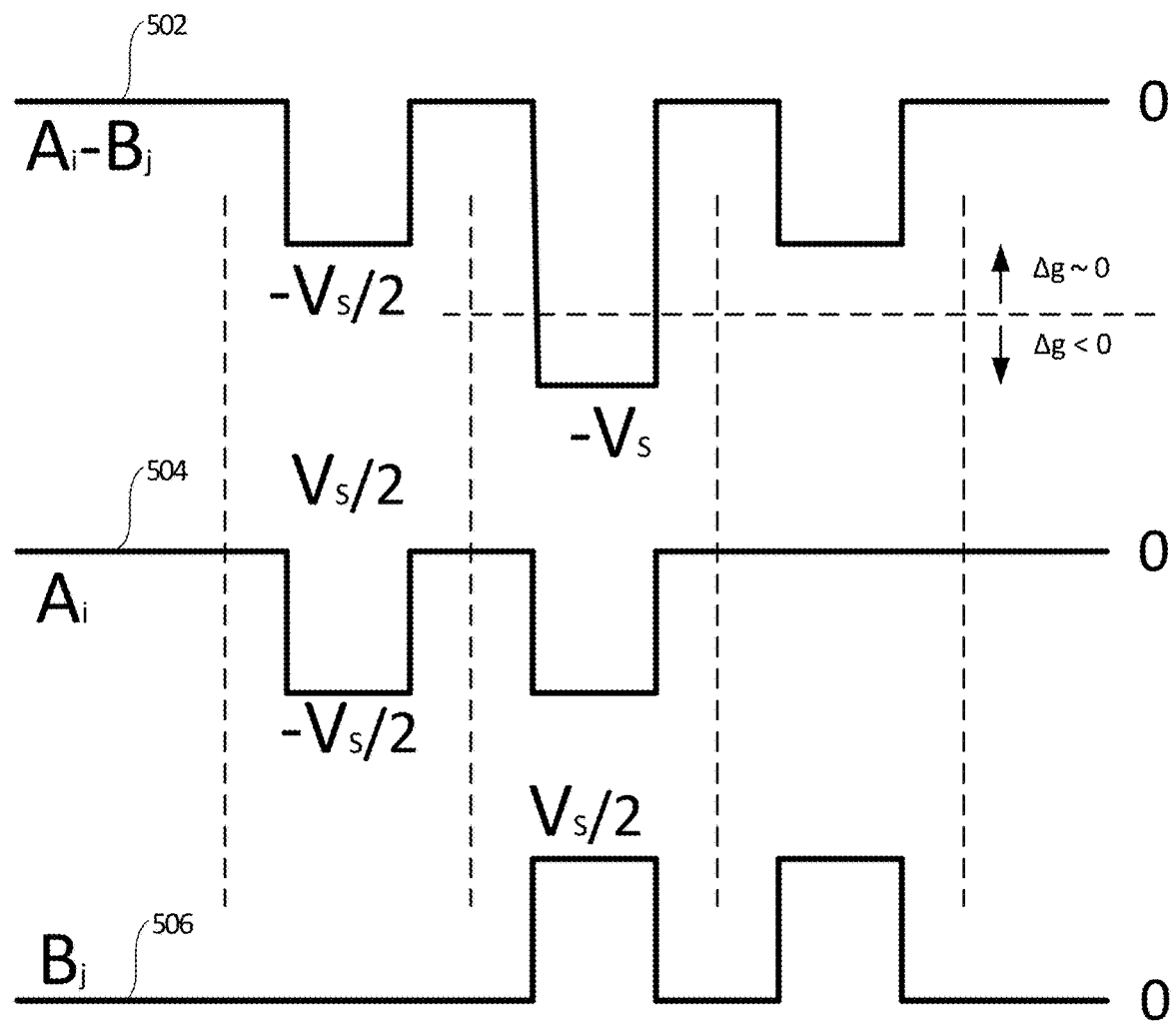
FIG. 5 illustrates an alternative pulsing scheme for the resistive processing units during a update cycle according to certain embodiments of the present disclosure.

Referring now to FIG. 4, a pulsing scheme 400 that enables the stochastic update rule of Equation (2) for the RPU 102-2 is shown according to certain embodiments of the present disclosure. The voltage pulses with positive and negative amplitudes are sent from corresponding STRs on rows ($A_i$) and columns ($B_j$), respectively. Translated stochastic numbers are represented by whole population of these pulses. In order for a two-terminal RPU device to distinguish coincidence events at a cross-point, its conductance value should not change significantly when a single pulse Vs/2 is applied to a device from a row or a column. However, when two pulses coincide and the RPU device sees the full voltage (Vs) the conductance should change by nonzero amount $\Delta g_{min}$. The parameter $\Delta g_{min}$ is proportional to $\Delta w_{min}$ through the amplification factor defined by neuron circuitry. To enable both up and down changes in conductance the polarity of the pulses can be switched during the update cycle as shown in FIG. 5. A second pulsing scheme 500 allows all the RPU devices in an array to work in parallel and perform the multiplication operation locally by simply relying on the statistics of the coincidence events, thus achieving the O(1) time complexity for the weight update cycle of the training algorithm.

Figure 6:
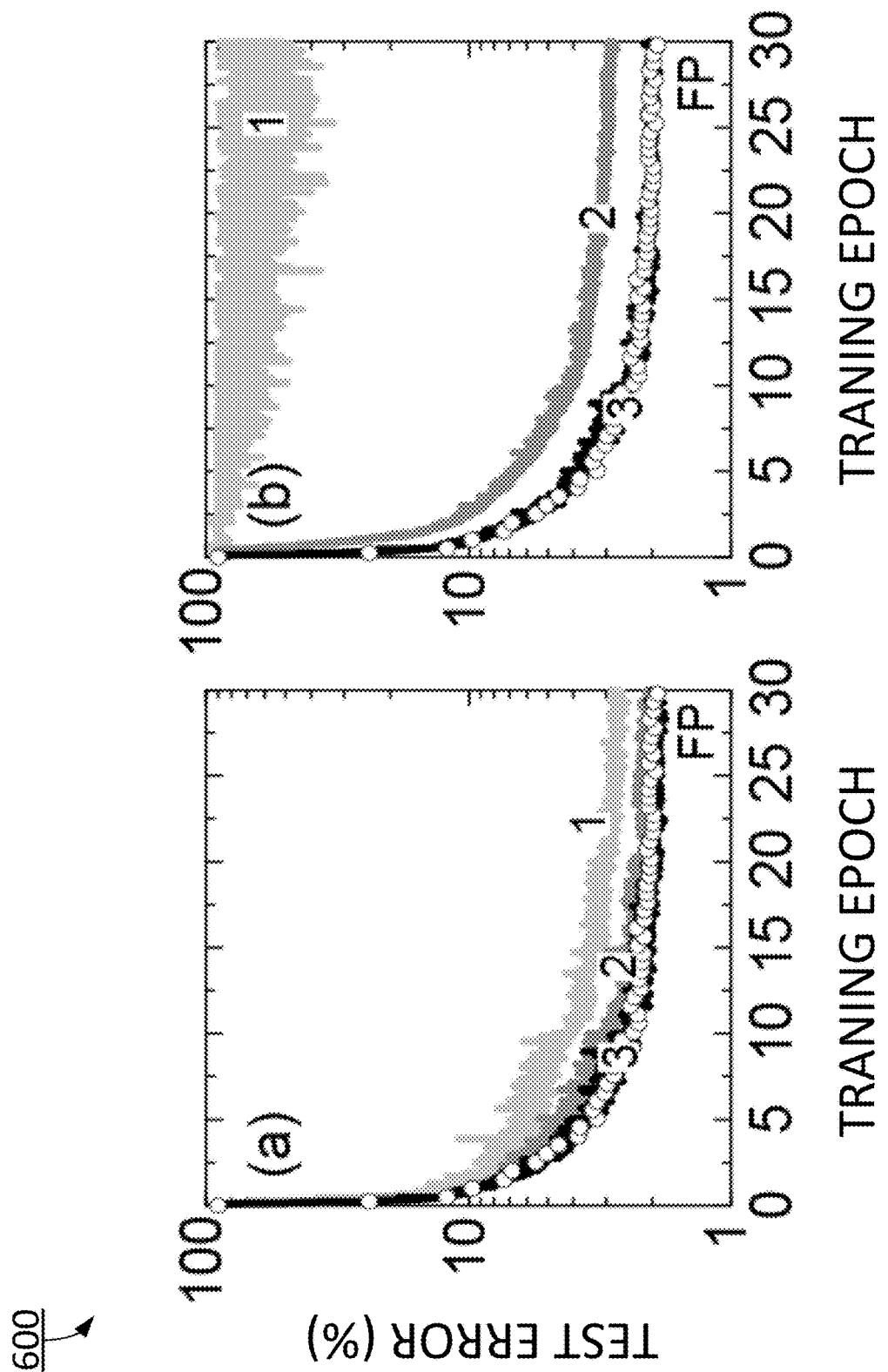
FIG. 6 shows two test errors charts comparing conventional floating point training and RPU based hardware that uses stochastic update rule according to certain embodiments of the present disclosure.

In certain embodiments, to test the validity of this approach, comparisons of classification accuracies achieved with a neural network having fully connected layers with 784, 256, 128 and 10 neurons, respectively. This network is trained with a Mixed National Institute of Standards and Technology (MNIST) standard training dataset using cross-entropy objective function. Raw pixel values are given as inputs, while sigmoid and softmax neurons are used in hidden and output layers, respectively. FIG. 6 shows a set of classification error curves for the MNIST test data. The curve marked with open circles in FIG. 6 corresponds to a baseline model where the network is trained using the conventional update rule as defined by Equation (1) with a floating point multiplication operation. Typically, batch training is performed to decrease the number of updates and hence the overall training time. Here, in order to test the most update demanding case, the batch size of unity is chosen throughout the following experiments. Learning rates of $\eta$=0.01, 0.005 and 0.0025 for epoch 0-10, 11-20, and 21-30, respectively, are used. The baseline model reaches classification error of 2.0% on the test data in 30 epochs.

In order to make a fair comparison between the baseline model and the stochastic model in which the training uses the stochastic update rule of Equation (2), the learning rates need to match. In the most general form the average change in the weight value for the stochastic model can be written as $$\mathbb{E}(\Delta w_{ij}) = BL\Delta w_{min} C^2 x_i \delta_j. \quad (3)$$

Therefore the learning rate for the stochastic model is controlled by three parameters BL, $\Delta w_{min}$, and C that should be adjusted to match the learning rates that are used in the baseline model.

Although the stochastic update rule allows to substitute multiplication operation with a simple AND logic operation, the result of the operation, however, is no longer exact, but probabilistic with a variance to mean ratio that scales with $1/\sqrt{BL}$. Increasing the stochastic bit stream length BL would decrease the error, but in turn would increase the update time. In order to find an acceptable range of BL values that allow to reach classification errors similar to the baseline model, training was performed using different $\Delta w_{min} = \eta/BL$, and C=1 in order to match the learning rates used for the baseline model as discussed above. As it is shown in (a) of FIG. 6, BL as small as 10 is sufficient for the stochastic model to become indistinguishable from the baseline model.

In FIG. 6, open white circles correspond to the baseline model with the training performed using the conventional update rule of Equation (1). In (a) of the FIG. 6, lines marked as 1, 2, and 3 correspond to the stochastic model of Equation (1) with stochastic bit lengths BL=1, 2 and 10, respectively. (b) Lines marked as 1, 2, and 3 correspond to the stochastic model with BL=10 and the non-linearity ratio k=0.5, 0.4 and 0.1, respectively.

In certain embodiments, for realistic technological implementations of the crossbar array, the array size may ultimately be limited by resistance and parasitic capacitance of the transmission lines resulting in significant RC delay and voltage drop. In certain embodiments, the RPU devices are integrated at back-end-of-line (BEOL) stack in-between intermediate metal levels. This allows the top thick metal levels to be used for power distribution, and the lower metal levels and the area under the RPU array for peripheral complementary metal-oxide semiconductor (CMOS) circuitry. Typical intermediate metal levels in a scaled CMOS technology have a thickness of 360 nm, and a width of 200 nm. Corresponding typical line resistance is about $r_{line}$=0.36 Ω/μm with parasitic capacitance of $c_{line}$=0.2 fF/μm. Assuming a reasonable 1G clock frequency for the pulses used during the update cycle, and allowing RC delay to be at most 10% of the pulse width (0.1 ns), the longest line length should be 1.64 mm. Assuming a reasonable line pitch of 200 nm this results in an array with 4096×4096 RPU devices. Since the conductance values of RPU devices can only be positive, we assume that a pair of identical RPU device arrays is used to encode positive and negative weight values. To minimize the area, these two arrays can be stacked on top of each other occupying 4 consecutive metal levels resulting in a total area of $A_{array}$=2.68 mm². For this array size a full update cycle (both positive and negative) performed using 1 ns pulses can be completed in 20 ns for BL=10.

In another aspect, the present disclosure relates to a neural network. In certain embodiments, the neural network may include an array of resistive processing units. The array of resistive processing units may one or more rows of resistive processing units, and one or more columns of resistive processing units. Each resistive processing unit may include: an AND gate configured to perform an AND operation of a first stochastic bit stream received from a first stochastic translator translating a number encoded from a neuron in a row and a second stochastic bit stream received from a second stochastic translator translating a number encoded from a neuron in a column, a first storage configured to store a weight value of the resistive processing unit, and a second storage configured to store an amount of change to the weight value of the resistive processing unit. When the first stochastic bit stream and the second stochastic bit stream coincide, the amount of change to the weight value of the resistive processing unit is added to the weight value of the resistive processing unit.

Figure 7:
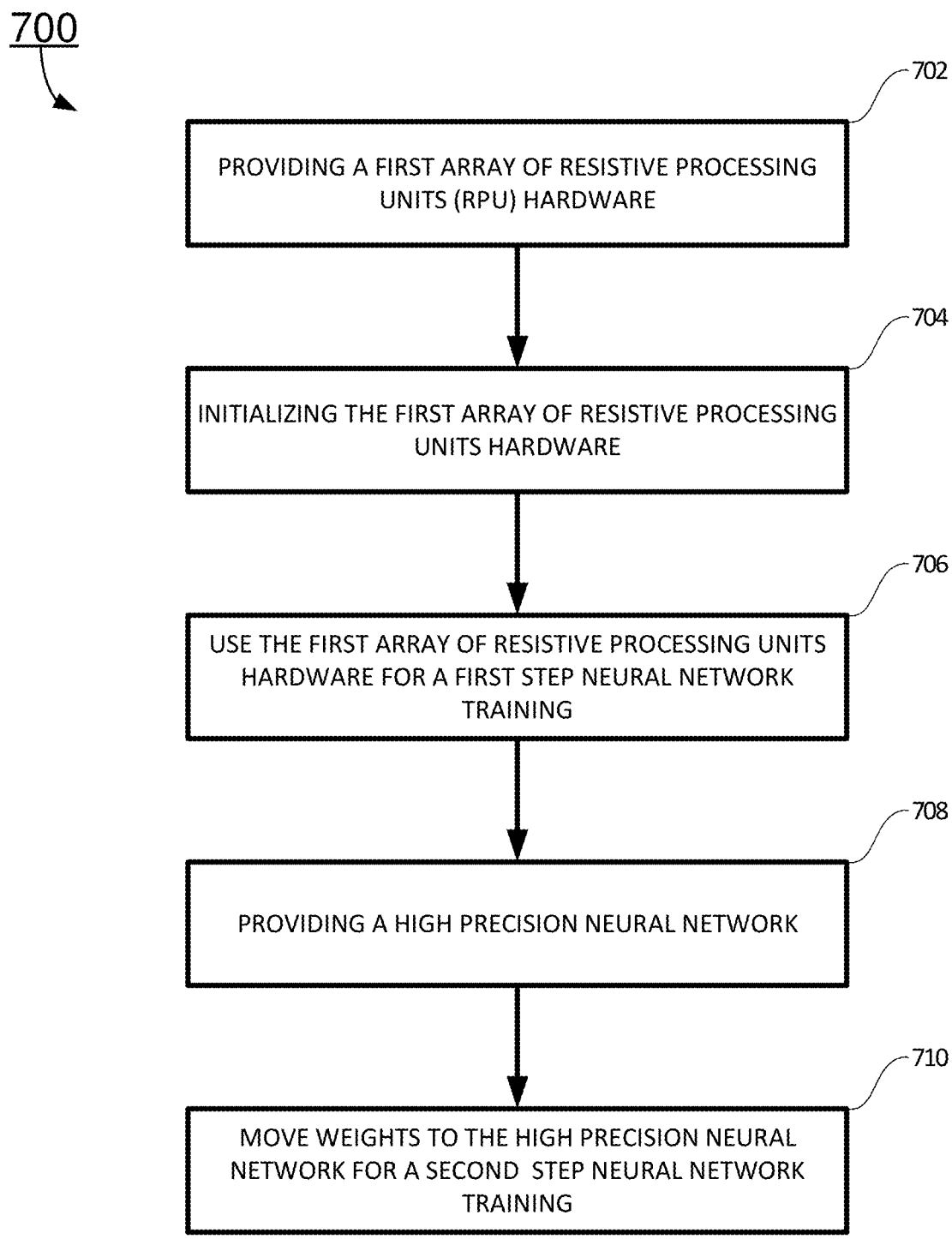
FIG. 7 shows a flow chart of a method of two step neural network training according to certain embodiments of the present disclosure.

In yet another aspect, the present disclosure relates to a neural network training method. Referring now to FIG. 7, a method 700 of a two step neural network training with noisy resistive processing units based hardware is shown according to certain embodiments of the present disclosure.

At block 702, the method may include providing a first array of resistive processing units (RPU) based hardware. In certain embodiments, the first array of resistive processing units (RPU) based hardware may include an array of noisy RPUs. The array of noisy RPUs may include N columns times M rows of RPUs, a total of N×M RPUs, where N is the total number of columns of the first array of RPUs, M is the total number of rows of the first array of RPUs, and N and M are both positive integers. In certain embodiments, a noisy RPU is a non-noisy RPU injected with certain type of noise such as thermal noise and shot noise that are all additive. In one embodiment, these additive noises may be modelled as a single Gaussian noise.

In certain embodiments, a RPU using two stochastic streams may be used to reduce the multiplication operation to a simple AND operation as shown in FIG. 3.

At block 704, once the first array of RPU is provided, the first array of RPU is initialized. Numbers of input neurons and output neurons are selected. In one embodiment, the number of input neurons may be 10 and the number of output neurons may be 10 based on a specific application of the neural network to be trained. In another embodiment, the number of input neurons may be 784 and the number of output neurons may be 784 to form a fully connected neural network layer. In certain embodiments, the number of input neurons and the number of output neurons may vary from 40,000 or even more. In other embodiments, the number of input neurons and the number of output neurons may be different.

In certain embodiments, the neural network may be trained with a backpropagation algorithm, including forward, backward, and weight update processes. Based on the application of the neural network, number of epochs may be selected. In one embodiment, the number of epochs may be 10. In another embodiment, the number of epochs may be 50.

In certain embodiments, a learning rate η may be chosen. In one embodiment, for a 30 epoch DNN training, η may be 0.01, 0.005, and 0.0025 for epochs 0-10, 11-20, and 21-30, respectively.

In certain embodiments, a length of the stochastic bit stream at the output of stochastic translators (STR) BL may be selected. In one embodiment, BL may be 8. In another embodiment, BL may be 10.

In certain embodiments, the number of epochs, the learning rate and the length of the stochastic bit stream at the output of stochastic translators (STR) BL may be selected differently depending on the applications. The numbers chosen in the examples above are only used for illustrations only, and they are not intended to be exhaustive or limited to the embodiments disclosed.

At block 706, once the first array of RPU is initialized, an initial neural network training (first step) using the first array of noisy RPUs is performed. Input is provided in at the input neurons. A neuron state controller (not shown in FIG. 1) may be used to control the progression of the neural network training. After a predetermined number of epochs, the first step neural network training is completed. Once the first step neural network training is completed, the weight values in each of the RPUs of the first array of RPUs are extracted by a weight extraction tool, such that these weight values may be transferred to other arrays of RPUs. In certain embodiments, the extracted weights may be used by another array of RPUs for signal processing to recognize patterns or speech. In certain embodiments, the extracted weights may be used to initialize another array of RPUs as a starting point for further neural network training.

At block 708, a high precision neural network may be provided. In certain embodiments, the high precision neural network may include a conventional floating point high precision neural network. In certain embodiments, preferably, the high precision neural network may have the same or similar structure as the first array of RPUs. The high precision neural network may be initialized in a similar manner with a set of predetermined parameters. The set of predetermined parameters may be fine-tuned based on the training results of the first array of RPUs.

At block 710, in certain embodiments, each of the weight values of the first array of RPUs may be transferred to a corresponding neuron of the high precision neural network. Once the weight values of the first array of RPUs are transferred, a second step neural network training using the high precision neural network is performed. Input is provided at the input neurons. A neuron state controller may be used to control the progression of the neural network training. After a predetermined number of epochs, the second step neural network training is completed. Once the second step neural network training is completed, the weight values in each of the neurons of the high precision neural network may be extracted by the weight extraction tool, such that these weight values may be transferred to other arrays of RPUs or other neural networks. In certain embodiments, the extracted weights may be used by another array of RPUs for signal processing to recognize patterns or speech.

In certain embodiments, the benefits of using this two step neural network training may include drastically reducing the training time by using the noisy resistive processing units to pre-train the neural network, and further reducing error rate by using the high precision neural network.

Figure 8:
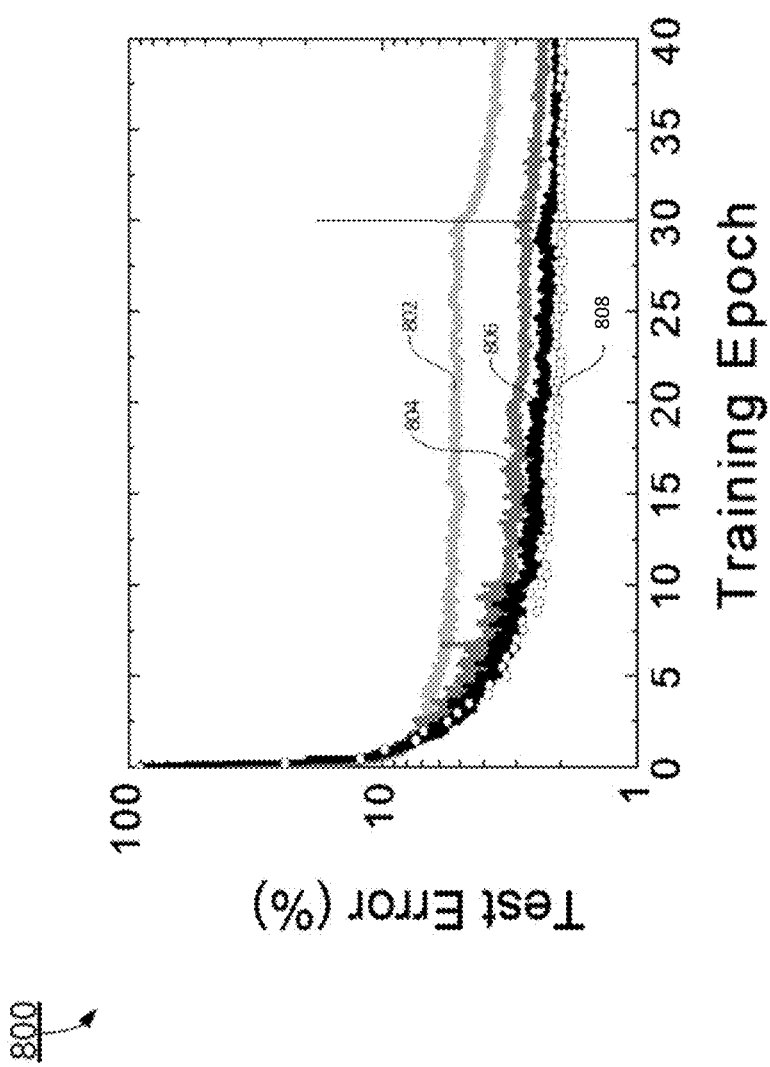
FIG. 8 shows an exemplary test errors chart comparing conventional floating point training and two step training according to certain embodiments of the present disclosure.

Referring now to FIG. 8, an exemplary test errors chart comparing conventional floating point training and the two step neural network training is shown according to certain embodiments of the present disclosure. In certain embodiments, the neural network is trained through 30 epochs in the first step neural network training, and through another 10 epochs in the second step neural network training.

During the first step training, a neural network with noisy resistive processing units (RPUs) is used. Due to the simplicity of the calculations without multiplications, weight values converge much faster than conventional floating point training. The neural network with noisy RPU hardware reaches reasonable accuracies, but not as competitive as the conventional floating point training, which takes much longer time to achieve. Open white circles 808 in the chart correspond to the baseline model with the training performed using the conventional floating point training according to the update rule of Equation (1). Lines 802, 804, and 806 correspond to the stochastic model training according to the update rule of Equation (2), with different ranges of noise on the RPU devices.

During the second step training, a high precision neural network is used. The training time is significantly reduced because the neural network is already pre-trained. In the second step training, the high accuracy neural network is used to achieve even better accuracies than only a noisy RPU based hardware.

As shown in FIG. 8, two step neural network training achieves significantly better than single step training with noisy resistive processing units based hardware. Two step neural network training achieves classification error as good as floating point neural network training method while performing first step neural network training on a fast but noisy resistive processing units based hardware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An array of resistive processing units comprising:
a plurality of rows of resistive processing units; and
a plurality of columns of resistive processing units,
wherein each resistive processing unit comprises:
an AND gate configured to perform an AND operation of a first stochastic bit stream received from a first stochastic translator translating a first number encoded from a neuron in a row and a second stochastic bit stream received from a second stochastic translator translating a second number encoded from a neuron in a column;
a first storage configured to store a weight value, $w_{ij}$, of the resistive processing unit; and
a second storage configured to store an amount of change to the weight value of the resistive processing unit,
wherein when the first stochastic bit stream and the second stochastic bit stream coincide, the amount of change to the weight value of the resistive processing unit is added to the weight value of the resistive processing unit according to the following equation:

$$w_{ij} \leftarrow w_{ij} + \Delta w_{min} \sum_{n=1}^{BL} A_i^n \wedge B_j^n,$$

where BL is the length of the first stochastic bit stream and A and B are random variables characterized by a Bernoulli process with the superscript, n, representing a bit position in the sequence.

2. The array of resistive processing units of claim 1, wherein each of the first stochastic translator and the second stochastic translator comprises a bit length of a stochastic bit stream.

3. The array of resistive processing units of claim 2, wherein the bit length of each of the first stochastic bit stream and the second stochastic bit stream is 10.

4. The array of resistive processing units of claim 1, wherein the AND gate comprises:
a first input terminal electrically coupled to the first stochastic bit stream;
a second input terminal electrically coupled to the second stochastic bit stream; and
an output terminal configured to provide an output of the AND operation of the first stochastic bit stream and the second stochastic bit stream.

5. The array of resistive processing units of claim 4, wherein the output terminal of the AND gate is true when the first stochastic bit stream and the second stochastic bit stream coincide.

6. The array of resistive processing units of claim 1, wherein the array of resistive processing units further comprises a neuron state controller configured to control a forward propagation, a backward propagation, and a weight update of a neural network training.

7. A neural network comprising:
an array of resistive processing units having:
a plurality of rows of resistive processing units; and
a plurality of columns of resistive processing units,
wherein each resistive processing unit comprises:
an AND gate configured to perform an AND operation of a first stochastic bit stream received from a first stochastic translator translating a first number encoded from a neuron in a row and a second stochastic bit stream received from a second stochastic translator translating a second number encoded from a neuron in a column;
a first storage configured to store a weight value, $w_{ij}$, of the resistive processing unit; and a second storage configured to store an amount of change to the weight value of the resistive processing unit, wherein when the first stochastic bit stream and the second stochastic bit stream coincide, the amount of change to the weight value of the resistive processing unit is added to the weight value of the resistive processing unit according to the following equation:

$$w_{ij} \leftarrow w_{ij} + \Delta w_{min} \sum_{n=1}^{BL} A_i^n \wedge B_j^n,$$

where BL is the length of the first stochastic bit stream and A and B are random variables characterized by a Bernoulli process with the superscript, n, representing a bit position in the sequence.

8. The neural network of claim 7, wherein each of the first stochastic translator and the second stochastic translator comprises a bit length of a stochastic bit stream.

9. The neural network of claim 7, wherein each of the first stochastic bit stream and the second stochastic bit stream comprises a random variable characterized by a Bernoulli process.

10. The neural network of claim 7, wherein the AND gate comprises:
   a first input terminal electrically coupled to the first stochastic bit stream;
   a second input terminal electrically coupled to the second stochastic bit stream; and
   an output terminal configured to provide an output of the AND operation of the first stochastic bit stream and the second stochastic bit stream.

11. The neural network of claim 10, wherein the output terminal of the AND gate is true, when the first stochastic bit stream and the second stochastic bit stream coincide.

12. The neural network of claim 7, wherein the array of resistive processing units further comprises a neuron state controller configured to control a forward propagation, a backward propagation, and a weight update of a neural network training.

* * * * *